US012661961B2

(12) United States Patent
Masanek, Jr. et al.

(10) Patent No.: US 12,661,961 B2
(45) Date of Patent: Jun. 23, 2026

(54) SIDE WINDOW DEFLECTOR

(71) Applicant: MACNEIL IP LLC, Bolingbrook, IL (US)

(72) Inventors: Frederick W. Masanek, Jr., Barrington, IL (US); Ryan Falkman, Bartlett, IL (US); Larry Melcher, Allendale, MI (US)

(73) Assignee: MACNEIL IP LLC, Bolingbrook, IL (US)

( * ) Notice: Subject to any disclaimer, the term of this patent is extended or adjusted under 35 U.S.C. 154(b) by 356 days.

(21) Appl. No.: 18/350,821

(22) Filed: Jul. 12, 2023

(65) Prior Publication Data

US 2025/0018774 A1     Jan. 16, 2025

(51) Int. Cl.
B60J 1/20 (2006.01)

(52) U.S. Cl.
CPC .................................. B60J 1/2002 (2013.01)

(58) Field of Classification Search
CPC ... B60J 3/005; B60J 1/20; B60J 1/2002; B60J 1/08; B60J 1/085; B60J 1/10; B62D 35/008
USPC ......................................... 296/152; D12/183
See application file for complete search history.

(56) References Cited

U.S. PATENT DOCUMENTS

| 4,476,774 | A | * | 10/1984 | Liberto | ...................... B60J 1/20 |
| | | | | | 454/135 |
| 5,797,645 | A | * | 8/1998 | Schenk | .................. B60J 1/2002 |
| | | | | | 454/132 |
| 5,957,524 | A | * | 9/1999 | Feder | ......................... B60J 1/20 |
| | | | | | 296/152 |
| 7,172,240 | B1 | * | 2/2007 | Kaufman | .............. B60J 1/2002 |
| | | | | | 454/131 |
| D544,821 | S | | 6/2007 | Elwell | |
| D554,571 | S | | 11/2007 | Elwell et al. | |
| D556,657 | S | * | 12/2007 | Elwell | .......................... D12/191 |
| 9,630,481 | B2 | * | 4/2017 | Rose | ...................... B60H 1/267 |
| 12,391,100 | B1 | * | 8/2025 | Wang | ........................ B60J 10/72 |
| 2013/0334837 | A1 | * | 12/2013 | Serentill | ............... B60J 1/2002 |
| | | | | | 296/97.1 |
| 2020/0130479 | A1 | * | 4/2020 | Rose | ...................... B60J 1/2002 |

OTHER PUBLICATIONS

Putco Element Tinted Window Deflectors, website, https://www.putco.com/product/element-tinted-window-visors/, downloaded Jul. 11, 2023.
Weathertech Side Window Deflectors, website, https://www.weathertech.com/side-window-deflectors/#, downloaded Jul. 11, 2023.

* cited by examiner

*Primary Examiner* — Roger L Pang
(74) *Attorney, Agent, or Firm* — Perkins IP Law Group LLC; Jefferson Perkins

(57) ABSTRACT

A side window deflector has a body, and a flange joined to the body for fitting into a channel of a vehicle door window. At least one camming facet is formed on an inner surface of a deflector body end portion, adjacent a junction of an end portion lower edge and a flange lower edge. An advancing top edge of a window glass will encounter this camming facet before it encounters any other structure of the body end portion. Some embodiments have two camming facets. The camming facet eases the upward travel of the window glass into its channel. The main and end portions of the body have curved and recurved transitions to the flange, mitigating against bending stress.

17 Claims, 14 Drawing Sheets

SIDE WINDOW DEFLECTOR

BACKGROUND OF THE INVENTION

Conventional motor vehicles with closed occupant compartments, such as almost all present-day automobiles, SUVs and light trucks, have side doors through which the occupants may enter and exit the vehicle. A typical vehicle side door has a window in its top portion. A glass pane, or window glass, may be moved from an open to a closed position. This is now almost universally done with an electrical window motor. In a typical arrangement, the window glass slides up and down. In a completely closed position, a top edge of the window glass seats in a top channel in the door window frame. In a maximally open position, the top edge of the window glass in some vehicle models will completely disappear into a receptacle provided for this purpose in the door. In other models, the top edge will still be visible.

Most vehicles have side window controls that permit the occupants to adjust the top edge of the window glass to a position intermediate fully open and fully closed. A driver or passenger may, for example, leave a small top portion of the window open, to permit ventilation of the interior.

Side window deflectors, otherwise known as "rain guards" or "vent visors", have been developed to permit the window to be left slightly open, thus permitting cooler or fresher air into the interior, while keeping out precipitation or the like. They also allow the innocuous venting of hot air from an interior of a vehicle parked in the sun. A so-called "in-channel" side window deflector has a flange which fits into the top door window channel and a body that extends outwardly and downwardly from the flange. Other deflectors have flanges that are meant to be attached to the exterior of the door frame. The occupant may position the top edge of the window glass above a lower edge of the deflector body, effectively keeping rain out of the interior, but allowing an air stream into it. In a parked car, such a slightly open window will look completely closed to a casual observer. Conventional side window deflectors are molded of transparent or opaque plastic.

These side window deflectors are almost always offered as automotive aftermarket items. The original equipment manufacturer (OEM) of the vehicle will always provide a top window channel with enough width to accommodate the top edge of the window glass, but it does not necessarily design this channel width to also accommodate a flange of a side window deflector. The bottom edge of at least one end of a side window deflector flange may find itself in the path of the top edge of a powered, heavy door glass as it upwardly advances. Where the door glass edge impacts the flange edge head-on, the heavy door glass may shatter the typically thinner and weaker deflector flange or body. This may in turn dislodge the deflector from the door channel. If the car is moving at the time, dangerous flying highway debris may result. Even where such a spatial interference does not cause deflector failure, it may tax the ability of the window glass motor to advance the window glass top edge beyond the lower edge of the flange and body, and fully seat the top edge of the window glass in the window channel.

Conventional in-channel side window deflectors have flanges that are mostly planar. The transition between the flange and the outwardly extending deflector body always has been abrupt. These abrupt transitions make the deflectors more susceptible to fracture at the flange/body joint and subsequent failure.

SUMMARY OF THE INVENTION

According to one aspect of the invention, a side window deflector is provided for fitting into a side window of a vehicle. The deflector has a body and a flange joined to the body. The flange has an inboard surface which substantially conforms to an xz sheet, where an x direction is horizontal and is substantially aligned to a direction of vehicle motion, and a z direction is at right angles to the x direction and is closer to the vertical than it is to the horizontal. In particular embodiments the z direction is slightly concavely curved relative to the center of the vehicle, and therefore the xz sheet is not planar but is likewise concavely curved. The body has a first end portion with a lower edge and an inner surface. The flange has a lower edge that is joined to the lower edge of the first end portion of the body at a junction. A camming facet is formed on the inner surface of the first end portion of the body to be adjacent the junction. The inner surface of the first end portion of the body has a surrounding portion that bounds the camming facet. The camming facet is disposed at an angle to this surrounding portion. As a top edge of the window glass upwardly advances relative to the lower edge of the first end portion of the body, the top edge will first contact the first end portion at the camming facet and then cam along its surface. This eases the upward motion of the window glass and prevents damage to the deflector.

In one embodiment, the lower edge of the first end portion is aligned with the x direction, while the deflector flange extends away from the junction upwardly and at an angle to the x direction. This creates a corner at the junction. This arrangement ensures that the camming facet will be the first end portion deflector structure that the window glass encounters in its upward travel.

The camming facet is provided for at least a first end portion of the deflector body. The first end portion usually is a rearward end. But there are some embodiments, such as ones provided for rear doors, that have both forward and rearward end portions with camming facets. In these embodiments, the flange has a second lower edge that is spaced from the first lower edge of the flange, and which joins a lower edge of the forward end portion of the body at a second junction. A second camming facet is formed on the inner surface of the forward end portion to be adjacent the second junction. The inner surface of the forward end portion of the body has a second surrounding portion which bounds the second camming facet. The second camming facet is disposed at an angle to this second surrounding portion.

According to another aspect of the invention, a side window deflector has a body that is elongate in an x direction, where x is horizontal and is substantially aligned with a fore and aft axis of the vehicle. The body has a first end portion with an inner surface and a lower edge. The deflector further includes a flange for fitting into a channel of a side window of the vehicle. The flange is joined to the body. This flange has an inboard surface that conforms to an xz sheet, where direction z is at right angles to direction x and is oriented more to the vertical than it is to the horizontal. In some embodiments the xz sheet may be slightly concavely curved relative to a center of the vehicle, while in other embodiments the xz sheet may be planar. A lower edge of the flange is joined to the lower edge of the first end portion at a junction. A camming facet is formed on the inner surface of the first end portion to be adjacent to the junction. The flange has a first thickness, while a region of the first end portion bounding the camming facet has a second thickness greater than the first thickness. A thickness of the camming facet varies from the first thickness to the second thickness. The camming facet thickness increases as a function of the distance from the lower edge of the first end portion of the body, and also increases as a function of the distance from the flange.

In some embodiments, such as those meant to fit rear windows, the first end portion of the body will be a rearward end portion, and the body will also include a forward end portion opposed to the rearward end portion. A second lower edge of the flange will join a lower edge of the forward end portion at a second junction. A second camming facet is formed on the inner surface of the forward end portion to be adjacent the second junction. A second region of the forward end portion bounds the second camming facet and has a third thickness, which may be substantially equal to the second thickness and which in any event is greater than the flange or first thickness. The thickness of the second camming facet varies from the first thickness to the third thickness. The thickness of the second camming facet increases as a function of its distance from the lower edge of the forward end portion, and also increases as a function of its distance from the flange.

In a further aspect of the invention, a side window deflector is provided for fitting into a channel of a side window of a vehicle. A body of the deflector is elongate in an x direction, where x is horizontal and is substantially aligned with a fore and aft axis of the vehicle. The deflector has a flange for fitting into the channel of the window of the vehicle. The flange is joined to the body. The flange has an inboard surface which substantially conforms to an xz sheet, where z is a direction at right angles to the x direction, is closer to the vertical than it is to the horizontal, and may be planar or may be concavely curved relative to a center of the vehicle. A first end portion of the body has an inner surface and a lower edge. A lower edge of the flange is joined to the lower edge of the first end portion of the body at a junction. A camming facet is formed on the inner surface of the first end portion to be adjacent this junction. The camming facet is formed at an angle to the xz sheet, such that an upper edge of a window glass will first contact the first end portion at the camming facet when upwardly advancing toward the channel of the vehicle side window.

In one embodiment, the first end of the body is a rearward end of the body. The lower edge of the flange is a first lower edge, and the camming facet is a first camming facet. In this embodiment the body of the side window deflector has a forward end portion opposed to the rearward end portion. The forward end portion has an inner surface and a lower edge. The flange has a second lower edge spaced from its first lower edge which joins the lower edge of the forward end portion at a second junction. A second camming facet is formed at this second junction on the inner surface of the forward end portion. The second camming facet is formed at a second angle to the xz sheet such that an advancing upper edge of the window glass will first contact the deflector at the first and second camming facets.

In yet another aspect of the invention, a side window deflector for a side window of a vehicle has a body that is elongate in an x direction that is substantially aligned with a direction of vehicle motion. The body has a lower edge and an upper margin opposed to the lower edge. The body has a main portion and a first end portion joined to the main portion. The deflector has a flange for fitting into the channel of the side window of the vehicle. An outboard surface of the flange substantially conforms to an xz sheet, where a z direction is at right angles to the x direction, and is oriented more to the vertical than it is to the horizontal. An outboard surface of the main portion upwardly extends from a lower edge of the main portion to an upper margin of the main portion. The outboard surface of the main portion has lower and upper segments. The lower segment adjoins the lower edge of the main portion and is concavely curved relative to the center of the vehicle. The upper segment extends from the lower segment to the upper margin of the main portion of the body and is convexly recurved relative to the center of the vehicle. A radius of curvature of the upper segment is at least about 1.5 mm, whereby the outboard surface of the main portion of the body makes a continuously curved transition to the outboard surface of the flange.

In a further aspect of the invention, a side window deflector for a side window of a vehicle has a body that is elongate in an x direction that is substantially aligned with a direction of vehicle motion. The body has a lower edge and an upper margin opposed to the lower edge. The body has a main portion and a first end portion joined to the main portion. The deflector has a flange for fitting into the channel of the side window of the vehicle. An outer surface of the first end portion of the body extends from an outboard surface of the main portion of the body to an outboard surface of the flange. The outer surface of the first end portion has an inboard segment that extends in the outboard direction from the outboard surface of the flange to an outboard segment. The outboard segment extends in turn from the inboard segment to the outboard surface of the main portion of the body. The outboard segment of the outer surface of the first end portion is concavely curved relative to the center of the main portion. The inboard segment of the outer surface of the first end is convexly recurved. A radius of curvature of this inboard segment is at least about 2 mm. In this manner, the outer surface of the body's first end portion makes a continuously curved transition to the outboard surface of the flange.

According to another aspect of the invention, a side window deflector is provided for a side window of a vehicle. A body of the deflector is elongate in an x direction, where x is substantially aligned to a fore and aft axis of the vehicle. The body has a main portion and a first end portion joined to the main portion. The main portion has a lower edge, an upper margin opposed to the lower edge, and an outboard surface that extends between the lower edge and the upper margin. A flange of the side window deflector is joined to the upper margin of the main portion. The flange has an outboard surface that substantially conforms to an xz sheet, where a z direction is at right angles to the x direction and is oriented more to the vertical than it is to the horizontal, and where the xz sheet is aligned to the x and z directions. The outboard surface of the main portion has lower and upper segments. The lower segment upwardly extends from the lower edge of the main portion, and the upper segment extends from the lower segment to the upper margin of the main portion. The lower segment of the outboard surface of the main portion of the body is concavely curved relative to a center of the vehicle. The upper segment thereof is convexly recurved relative to the center of the vehicle. In this way, the outboard surface of the main portion of the body makes a continuously curved transition to the outboard surface of the flange. An outer surface of the first end portion of the body extends so as to be curved in an xy plane, where a y direction is at right angles to a fore and aft axis of the vehicle, and the xy plane is in alignment with the x and y directions. The outer surface of the first end portion has an inboard segment that extends in an outboard direction from the outboard surface of the flange, and an outboard segment that extends in an outboard direction from the inboard segment of the first end portion to the outboard surface of the main portion. The outboard segment of the outer surface of the first end portion is concavely curved relative to the center of the main portion. The inboard segment of the outer surface of the first end portion is convexly recurved. In this manner, the outer surface of the first end portion makes a continuously curved transition to the outboard surface of the flange. Further, the outer surface of the first end portion is smoothly continuous with the outboard surface of the main portion, such that the radii of curvature thereof vary smoothly. These continuous curves enhance the strength of the joint between the body and the flange and improve aesthetics.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
FIG. 1 is a left side perspective view of a representative vehicle having front left and rear left doors, with side window deflectors according to the invention installed.

A representative vehicle 100 is shown in FIG. 1. This vehicle 100 is a late-model pickup truck with an extended cab. Vehicle 100 has a left front door 102 and a left rear door 104, and, of course, corresponding right front and rear doors (not shown). The front door 102 has a front glass pane or window glass 106 that may be raised or lowered. Similarly, the rear door 104 has a rear glass pane or window glass 108 that may be raised or lowered. A front side window deflector 110 has been installed in an upper channel of a front door window frame 112, and a rear side window deflector 114 has been installed in an upper channel of the rear door window frame 116. Corresponding side window deflectors (not shown) are of course installed in the right door windows (also not shown). Vehicle 100 has a longitudinal or fore-and-aft axis 118 which is horizontal and which is used herein as a reference in describing the deflectors 110 and 114.

Figure 2:
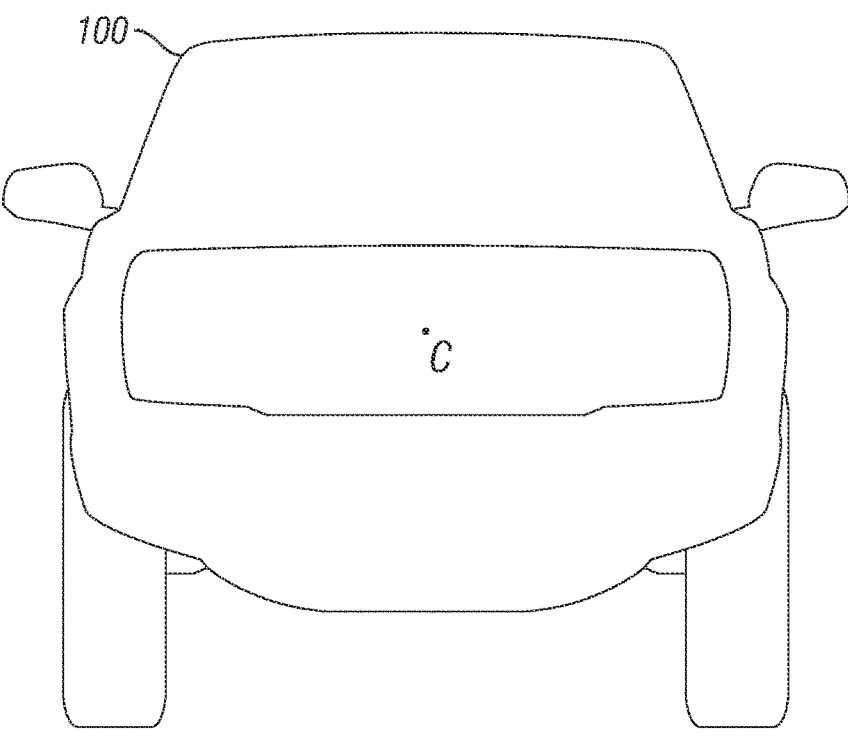
FIG. 2 is a schematic transverse cross-sectional view of the vehicle shown in FIG. 1, showing a vehicle center C.
Figure 3:
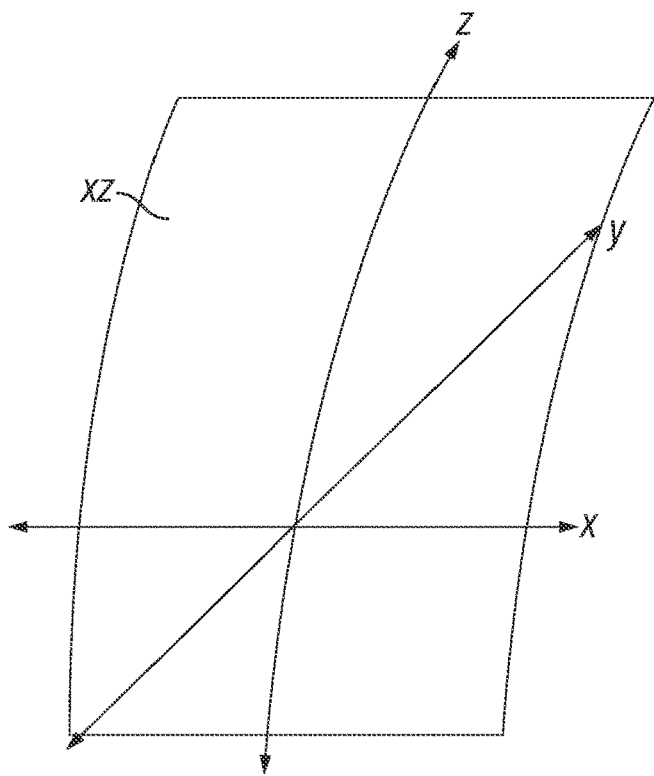
FIG. 3 is a frame of reference in which a direction z is tilted with respect to the vertical and is concavely curved relative to center C, the figure also showing a representative concavely curved xz sheet.

As representative vehicle 100 demonstrates, modern vehicle side door glass panes usually are not disposed in vertical planes, but rather are tilted upwardly and inwardly. Further, the glass panes may not be planar or move in planes. Instead, panes 106 and 108 typically are slightly concave relative to a vehicle center C (FIG. 2). The deflectors according to the invention will therefore be described using a frame of reference seen in FIG. 3. An x direction is horizontal and is substantially aligned with vehicle axis 118, although x may be slightly toed in, particularly for front window pane 106, to give the vehicle 100 better aerodynamics. A y direction is transverse or side-to-side, at ninety degrees to vehicle axis 118, and is horizontal. Herein reference is occasionally made to an inboard or outboard direction, both of which are parallel to the y direction. "Inboard" means towards axis 118, while "outboard" means away from axis 118. A z direction usually is concavely curved relative to center C, although its radius of curvature may be much larger than the distance of, e.g., pane 106 to center C; in other embodiments, z may be straight. The z direction is meant to emulate the vertical curvature and path of travel of the side window glass 106 or 108. In recent vehicles the z direction is oriented more to the vertical than it is to the horizontal, usually tilts inward as it proceeds upward, and is at a ninety degree angle with respect to direction x.

Since direction z is often not straight, surface xz may not be planar but instead may be a slightly curved sheet. Some of the structure of the invention therefore will be described and claimed in reference to an xz sheet rather than an xz plane. Any xz sheet will be parallel to direction x and will conform in its curvature to the curvature (if any) of direction z; any xz sheet will be aligned to directions x and z.

Figure 4:
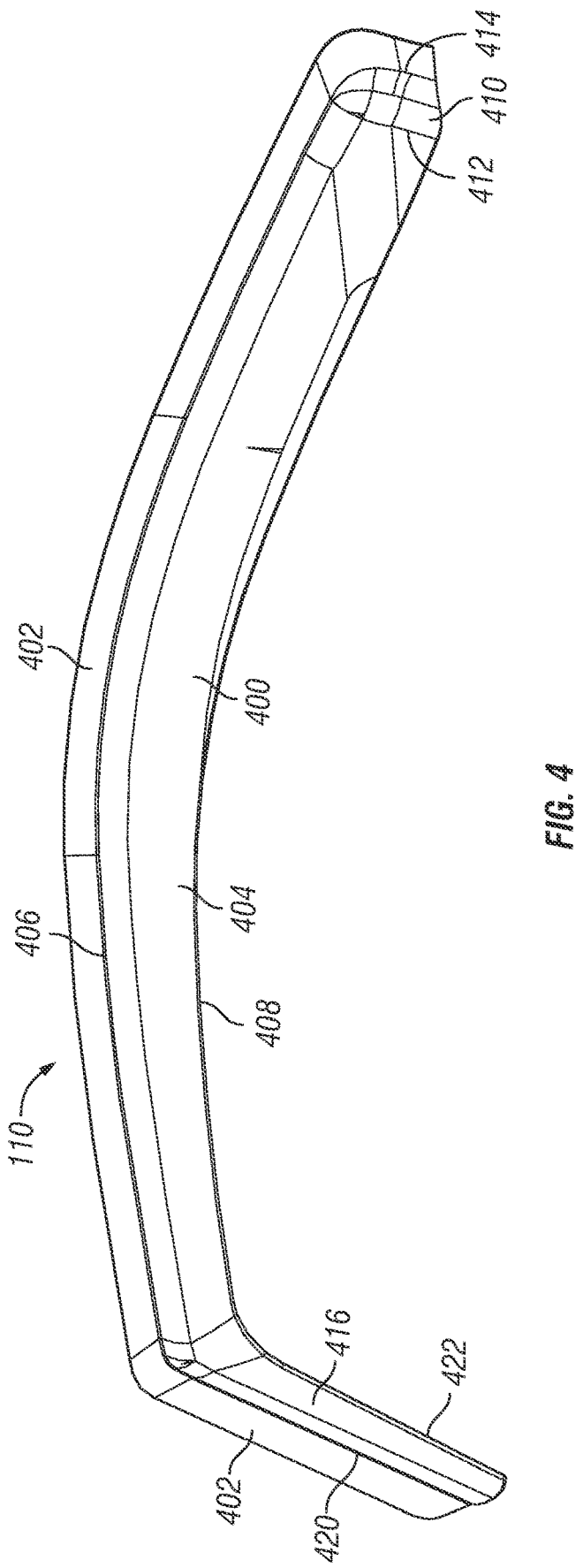
FIG. 4 is an outboard perspective view of a deflector for a left front door.

As seen in FIG. 4, the front window deflector 110 is elongate in an x direction (substantially side to side in this FIGURE). The two main components of deflector 110 are a body 400 and a flange 402. The body 400 has a main portion 404 that, except for a recurved segment described below, is concave relative to center C, and curves in a yz plane between an upper margin 406 and a lower edge 408, where any yz plane is aligned to directions y and z. The flange 402 may be planar for ease in manufacture, or may conform to an xz sheet defined by the curvature of the front window glass for a particular make and model; flange 402 may be slightly concavely curved. Because of the shape of deflector body 400, the lower edge 408 throughout main portion 404 will be outboard of the upper margin 406 and flange 402. The flange 402, with respect to main portion 404, extends upwardly and a little inwardly from upper margin 406.

Deflector 110 has a first, or rear, end portion 410. In both embodiments illustrated herein, the rear end portions are "capped" in that they curve around from the main portion in an xy plane to the flange. End portion 410 curves around from a margin 412 that it makes with main portion 404, to an inboard margin 414 at which it is joined to flange 402. The overall curvature of end portion 410 transitions from being curved only in a yz plane, to being curved only in an xy plane as the end of the flange 402 is approached. The curved surfaces of main portion 400 are smoothly continuous with corresponding curved surfaces of end portion 410.

Body 400 has a second, front end or portion 416 that conforms to the typically slanted front margin of the front window frame 112. The front end portion 416 is joined to main portion 404 and extends downwardly and forwardly therefrom. Front end portion 416 has an upper/forward margin 420 to which flange 402 is joined and from which flange 402 forwardly extends. Front end portion has a bottom/rear edge 422 that is located in an outboard direction from flange 402 and margin 420. Like main portion 404, front end portion 416 is concavely curved relative to vehicle center C. In this illustrated embodiment, the front end portion 416 is not "capped" like rear portion 410. In other embodiments, front end portion 416 could be "capped".

Figure 5:
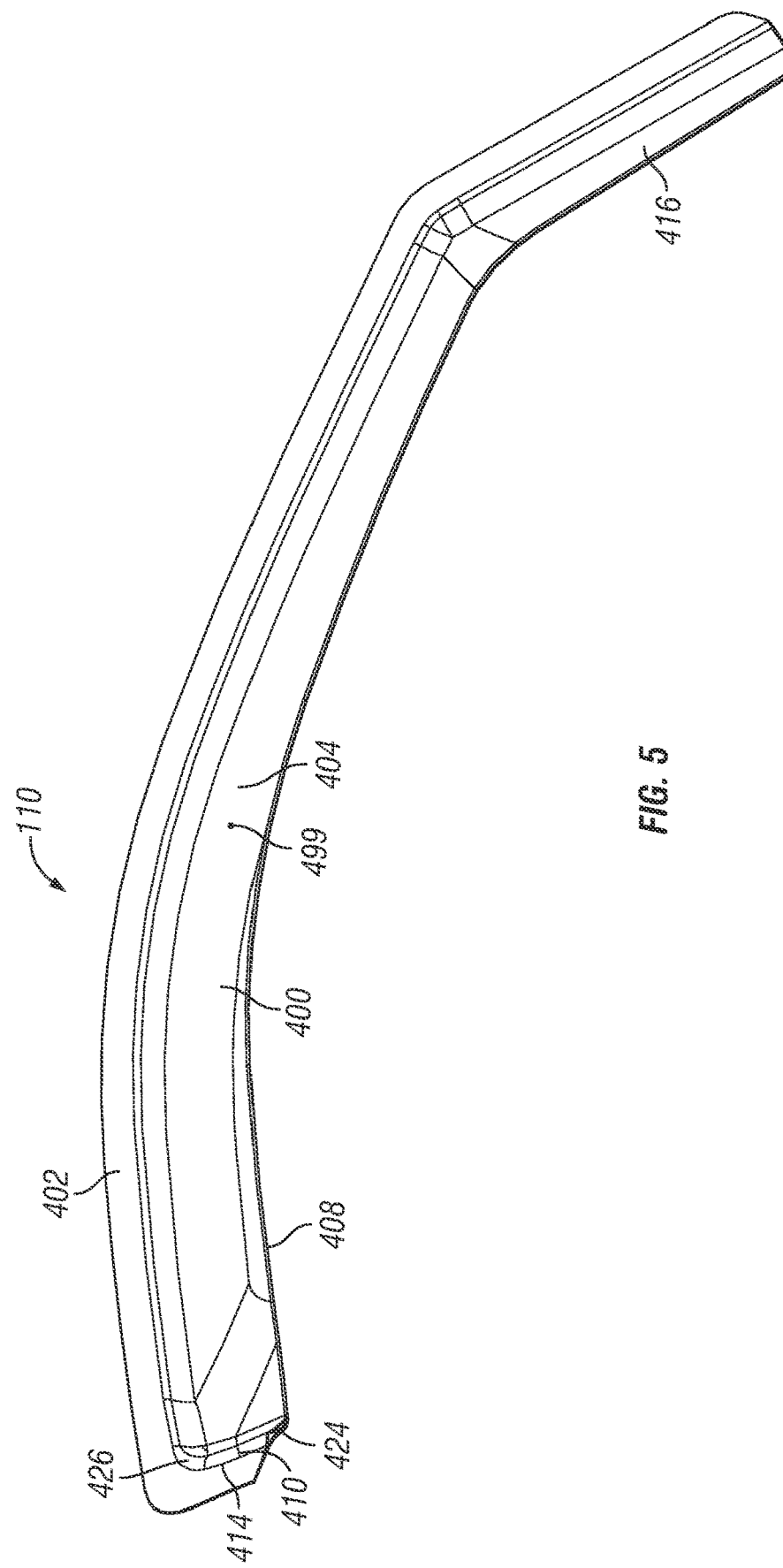
FIG. 5 is an inboard perspective view of the deflector shown in FIG. 4.

As seen in FIG. 5, a camming facet 424 is formed on an inner surface 426 of end portion 410. The main portion 404 has a center 499 which is used as a reference to describe certain directions of curvature.

Figure 6:
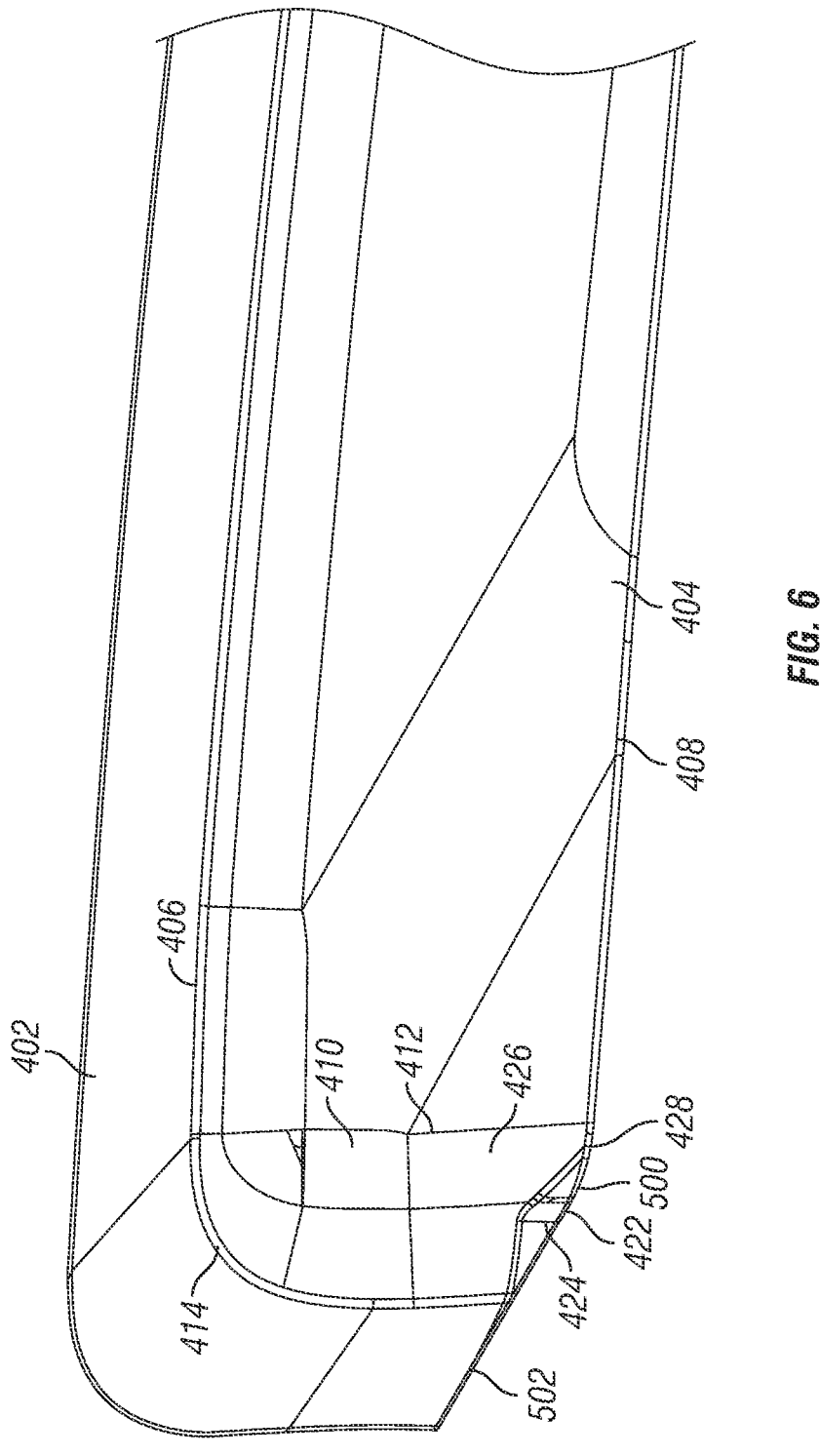
FIG. 6 is a detail from an inboard perspective of a rear end portion of the deflector shown in FIG. 5.

As seen in more detail in FIG. 6, a lower edge 428 of rear end portion 410 forms a junction 500 with a rear lower edge 502 of flange 402. Lower edge 428 is in this embodiment coplanar with main portion lower edge 408. The camming facet 424 is disposed to be adjacent junction 500. In this front-window embodiment, flange edge 502 makes a corner at junction 500 with lower edge 428, and extends away from junction 500 and upwardly relative to direction x. As will be further described below, this makes sure that the camming facet 424 is the first structure of end portion 410 that an advancing top edge of glass 106 will encounter. Flange edge 502 may make an angle of about 15 degrees relative to lower edges 428 and 408.

Figures 7, 8:
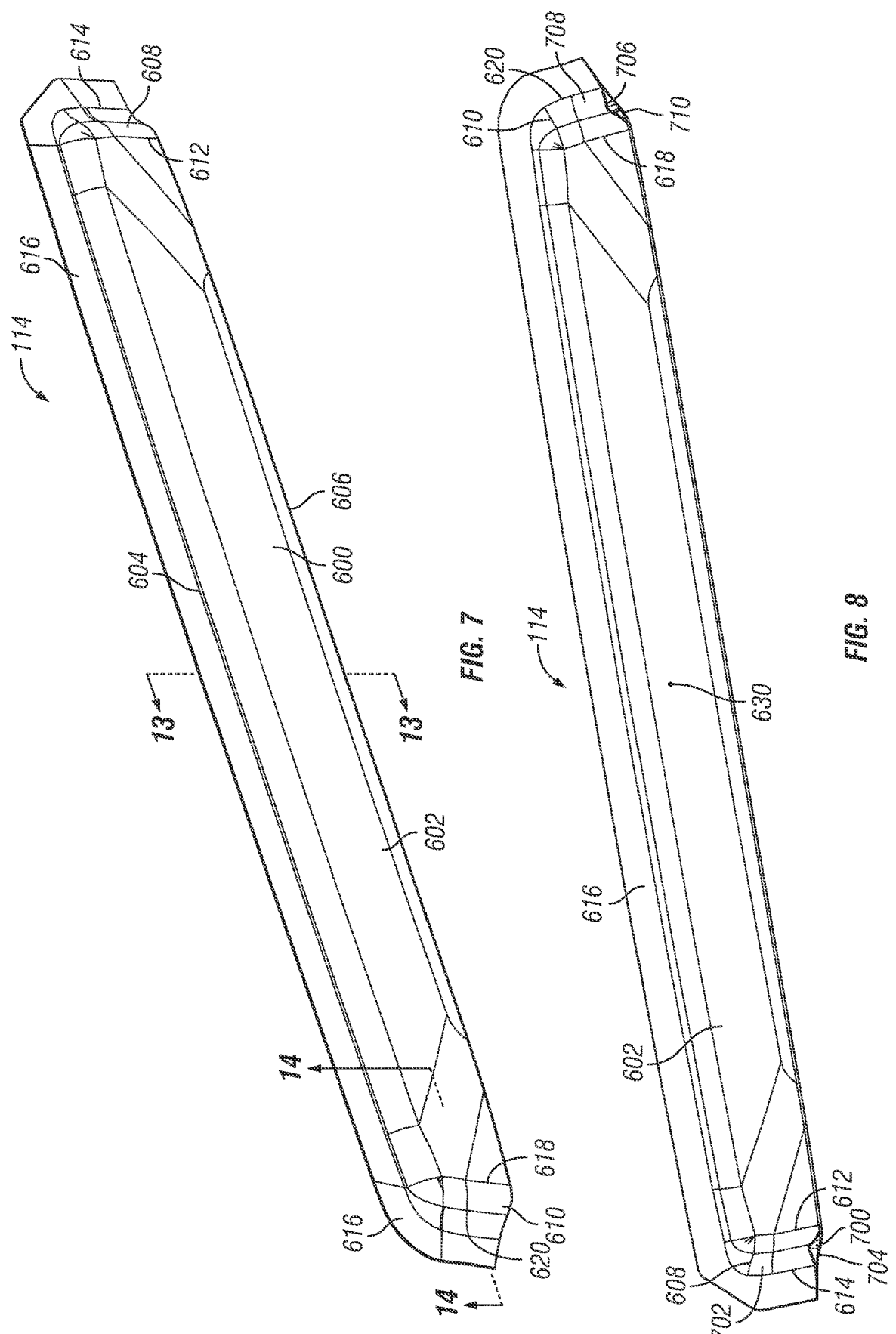
FIG. 7 is an outboard forward perspective view of a deflector for a left rear door.
FIG. 8 is an inboard perspective view of the deflector shown in FIG. 7.

The rear window deflector 114 is seen in more detail in FIGS. 7 and 8. Deflector 114 has a body 600 that is elongate in the x direction. A main portion 602 of body 600 has an upper margin 604 and a lower edge 606. Flange 616 is joined to main portion 602 at upper margin 604, is joined to end portion 608 at margin 614, and is joined to end portion 610 at margin 620. Except for a recurved upper segment described below, main portion 602 is concavely curved in a yz plane relative to vehicle center C. Unlike front window deflector body 400, rear window deflector body 600 has two "capped" ends: a first, rearward end portion 608, and a second, forward end portion 610. At its margin 612 with main portion 602, end portion 610 is curved only in a yz plane, but then smoothly and continuously transitions to being curved only in an xy plane as flange margin 614 is approached. Most, but not all, of this xy curvature will be concave with respect to main portion center 630 (FIG. 8). Similarly, end portion 610 is curved only in a yz plane at margin 618, but then smoothly and continuously transitions to being only curved in an xy plane as margin 620 is approached. Most, but not all, of this xy curvature will be concave with respect to a main portion center 630.

As seen in FIG. 8, a first camming facet 700 is formed on an inner surface 702 of rear end portion 608. Similarly, a second camming facet 706 is formed on an inner surface 708 of end portion 610.

Figure 9:
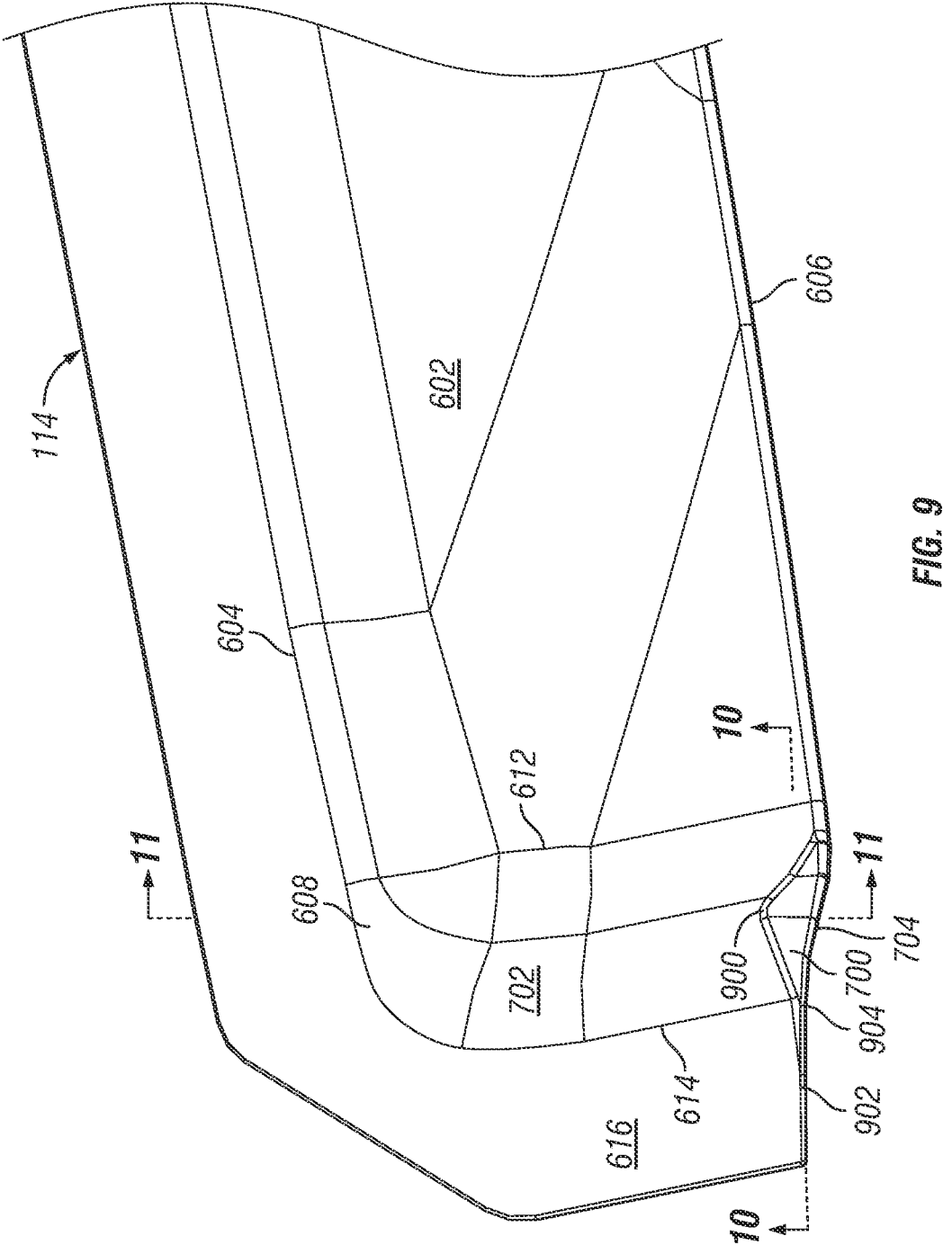
FIG. 9 is a detail of FIG. 8, showing a rear end portion camming facet.
Figure 10:
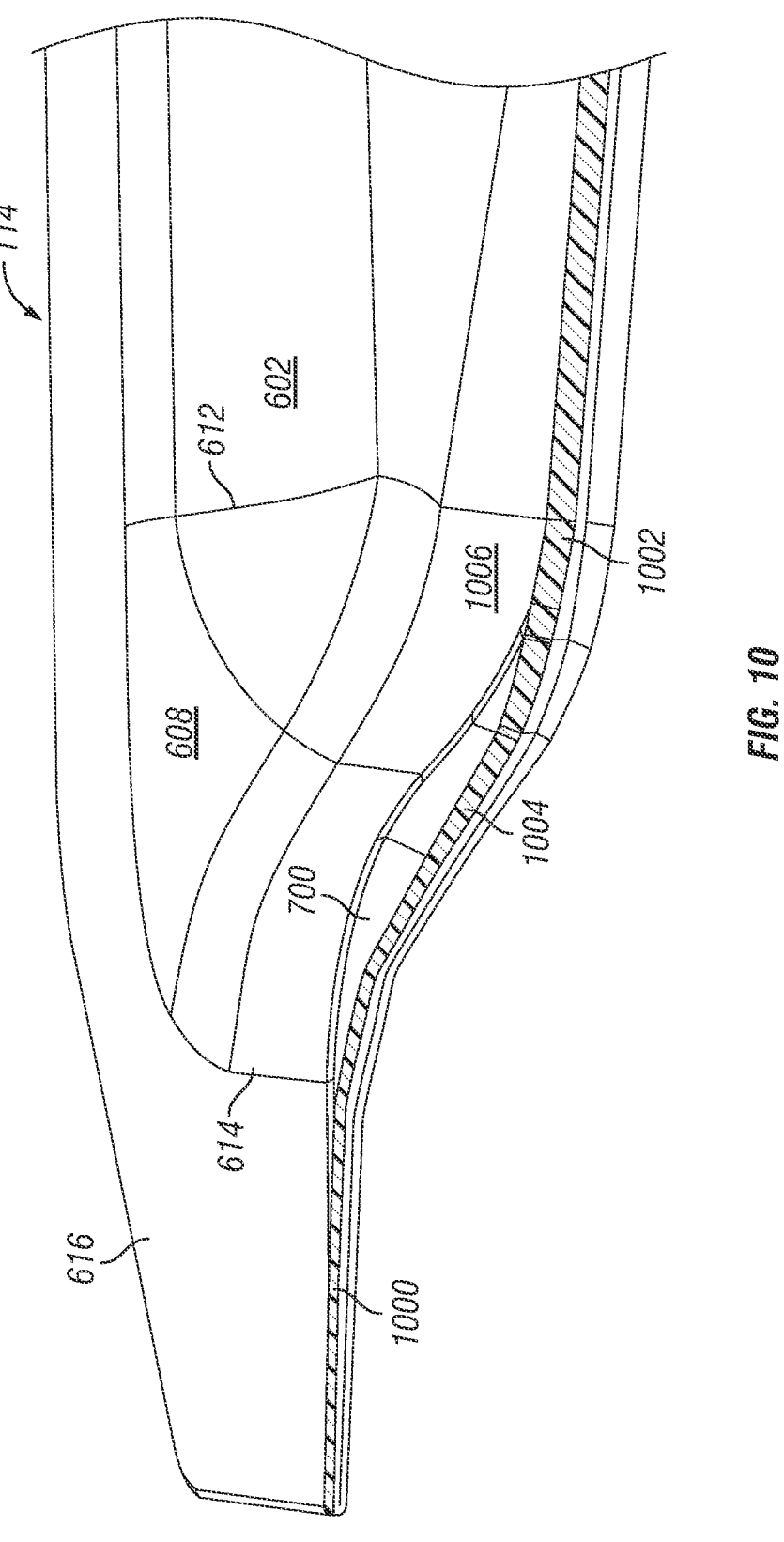
FIG. 10 is a longitudinal sectional view taken substantially along Line 10-10 of FIG. 9.
Figure 11:
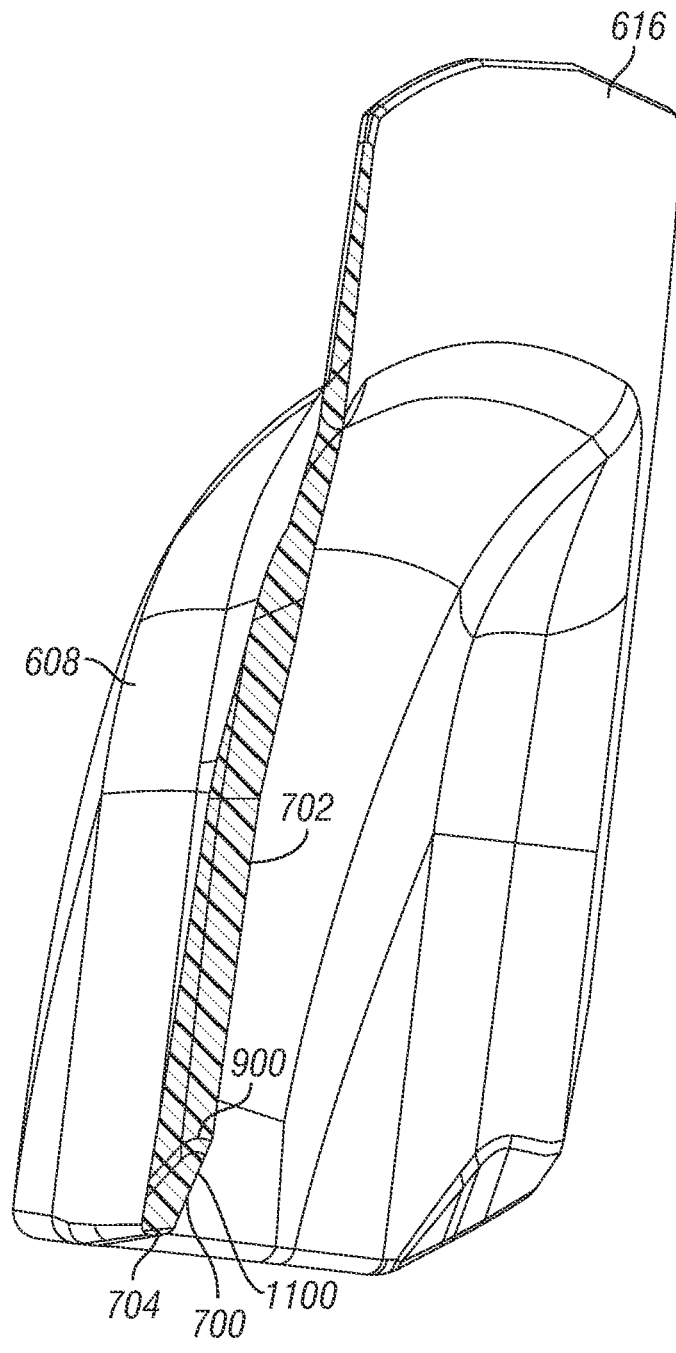
FIG. 11 is a transverse cross sectional view taken substantially along Line 11-11 of FIG. 9.

FIGS. 9-11 show camming facet 700 in more detail. Camming facets 424 and 706 are correspondingly similar in shape, position and function relative to the "capped" end portions with which they are associated. In the illustrated embodiment, facet 700 is roughly triangular in shape, with an apex 900 upwardly displaced from end portion lower edge 704. Facet 700 could take other shapes and/or have curved sides. Facet 700 is positioned to be adjacent a junction 904 between flange lower edge 902 and end portion lower edge 704. Facet 700 extends for most of end portion edge 704. Lower edge 902 may make an upward angle from lower edge 606, such as about 15 degrees. As seen in FIG. 10, a thickness 1000 of flange 616 stays fairly constant and is thinner than a thickness 1002 of body main portion 602 and of the nonfaceted region 1006 bounding facet 700 of the end portion 608. A thickness of region 1006 may be about 3 mm, while a thickness of 1000 of flange 616 may be about 1 mm. This relatively thin flange thickness is achievable if a particularly tough plastic is used to mold the deflector, such as polycarbonate. A thickness 1004 of the facet 700 varies monotonically between flange thickness 1000 and a thickness 1002 of region 1006. Thickness 1004 increases as a function of the distance away from the flange/end portion margin 614, and also increases as a function of the distance away from end portion edge 704 (FIG. 9).

Figure 12:
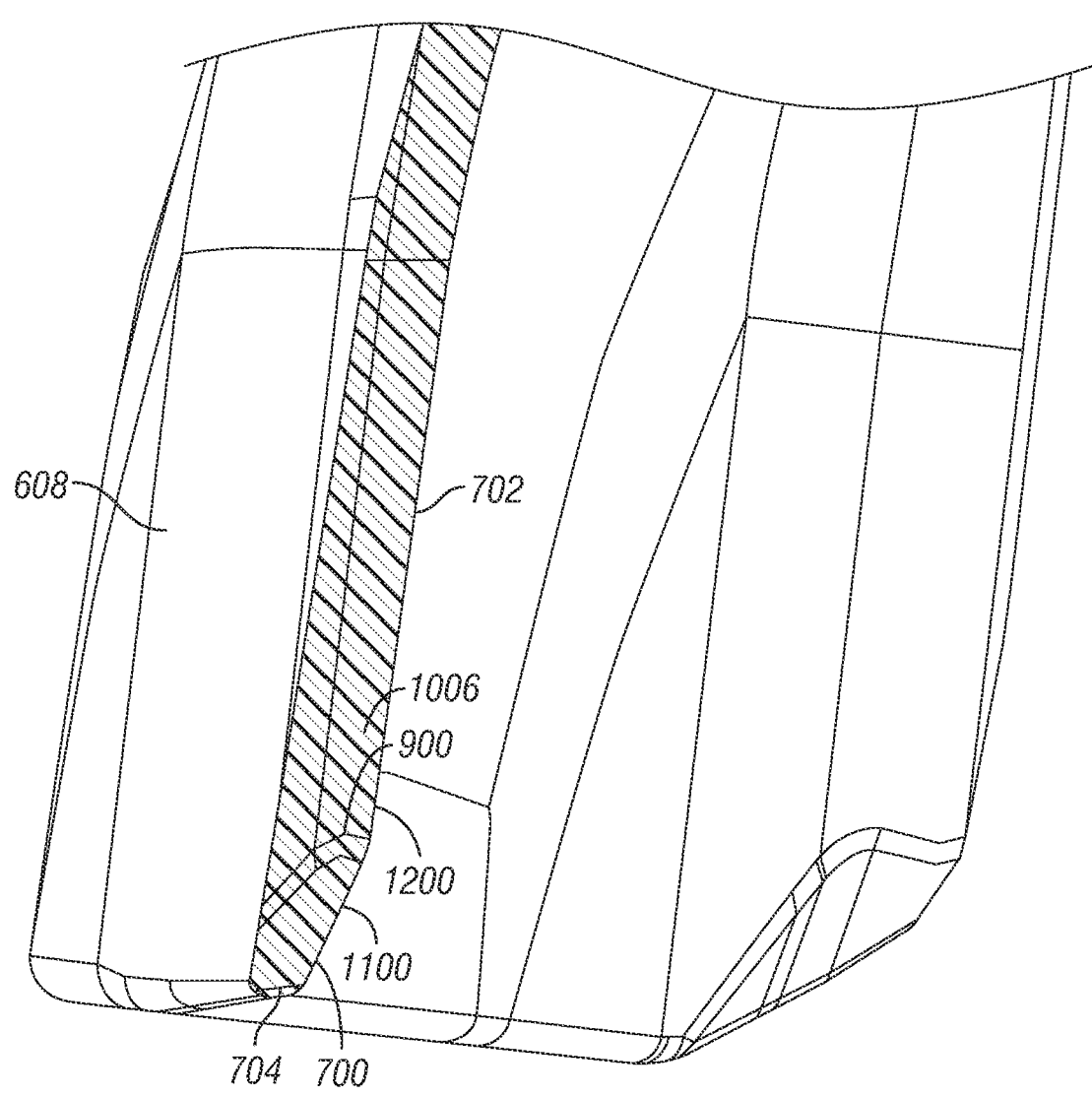
FIG. 12 is a detail of FIG. 11.

As seen in FIGS. 11 and 12, the facet 700 has a surface 1100 that is at an angle to end portion edge 704 and to a surrounding portion 1200 of inner surface 702 that bounds facet 700. This angle permits the facet 700 to perform its camming function when a top edge of the window glass 108 impacts it. While in the illustrated embodiment the camming facet surface 1100 is substantially flat, in other embodiments it may be curved and may be more smoothly continuous with surrounding inner surface portion 1200.

Figure 13:
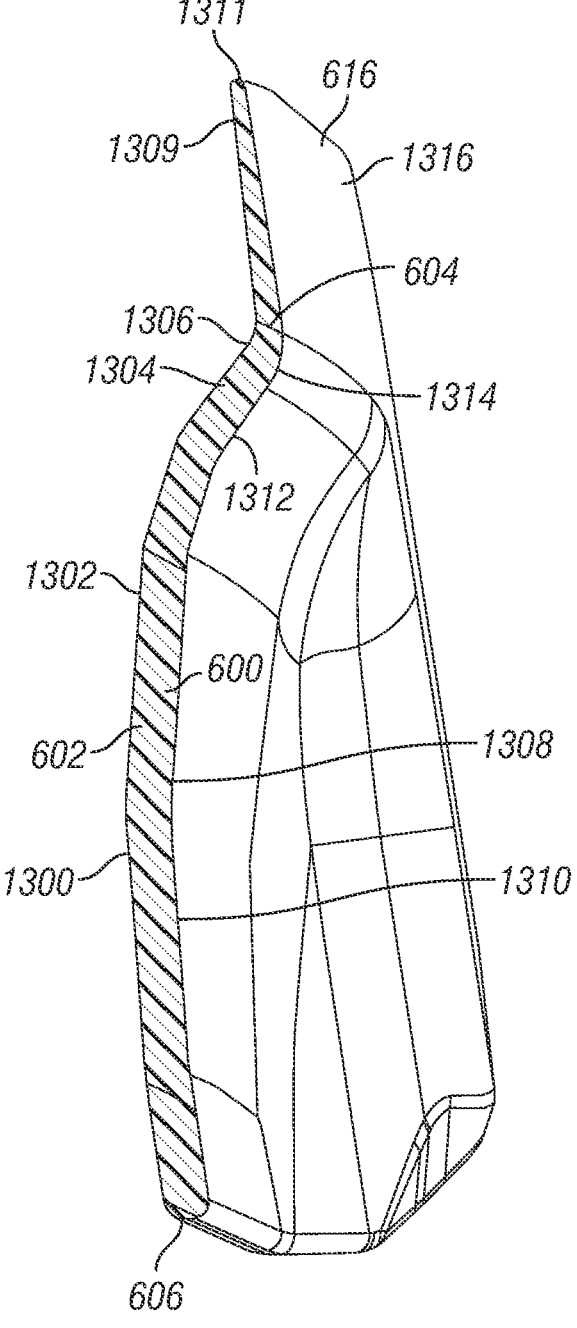
FIG. 13 is a transverse cross-sectional view taken substantially along Line 13-13 of FIG. 7.

FIG. 13 is a yz sectional view of main deflector portion 602, with the section taken well away from end portions 608 or 610. The deflector body 600 has a substantially uniform thickness. An outboard surface 1300 of main portion 602 has a lower segment 1302 that is concavely curved relative to vehicle center C. Segment 1302 extends from lower edge 606 to a margin 1304 with an upper segment 1306 thereof. Segment 1306 in turn extends from junction 1304 to body upper margin 604, and is convexly recurved relative to center C. The radius of curvature of upper segment 1306 can be about 1.5 to about 6 mm and in one embodiment is about 1.65 mm. An outboard surface 1309 of flange 616 begins at main portion upper margin 604 and continues to an upper flange edge 1311.

In a similar fashion, an inboard surface 1308 of main portion 602 has a lower segment 1310 that extends from lower edge 606 to a margin 1312. Lower segment 1310 is concavely curved relative to vehicle center C. An upper segment 1314 of inboard surface 1308 extends from margin 1312 to body upper margin 604, and is convexly recurved relative to vehicle center C. A radius of curvature of upper segment 1314 can be about 5 mm. An inboard surface 1316 of flange 616 upwardly continues from main portion upper margin 604 to flange edge 1311. The curving and recurving of body main portion 602 provides a smooth transition to flange 616. This makes the joint 604 between the flange 616 and the body 602 more capable of withstanding a tangential force or bending stress tending to separate body 600 from flange 616. Replacing an otherwise abrupt junction with one having smooth curved transitions also improves aesthetics.

Figure 14:
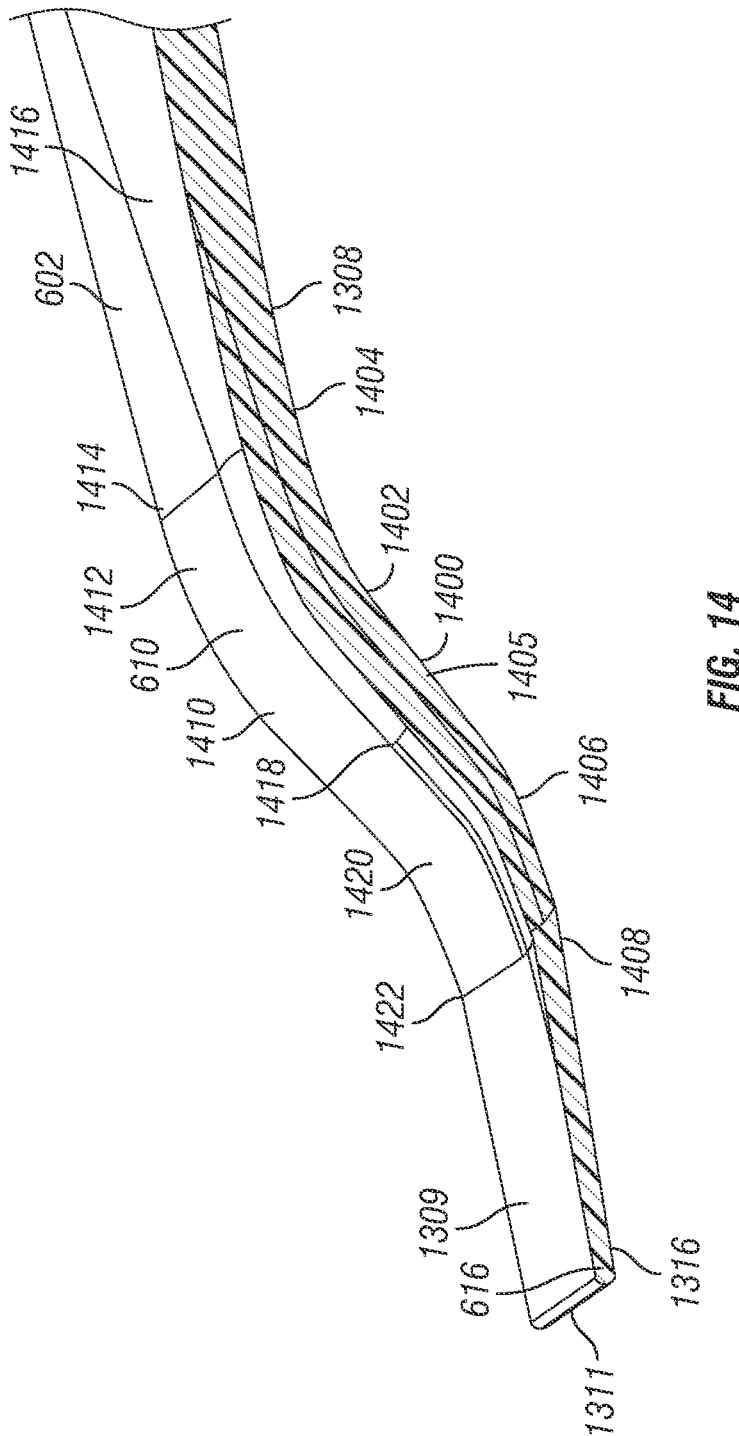
FIG. 14 is a longitudinal cross-sectional view taken substantially along Line 14-14 of FIG. 7.

These smooth, curved and recurved transitions also appear in each capped end portion of the deflectors. FIG. 14 is a longitudinal sectional view through forward end portion 610 and flange 616. End portions 410 and 608 are similar and mirror-imaged in section. The end portion 610 has an inner surface 1400 with a first outboard segment 1402 that extends from a margin 1404 with main portion inboard surface 1308 to a margin 1405 with a second, inboard segment 1406. The first surface segment 1402 is concavely curved in an xy plane with respect to main portion center 630 (FIG. 8). The second surface segment 1406 extends from its margin 1404 with first surface segment 1402 to an end portion margin 1408 that it makes with inboard flange surface 1316. The second surface segment 1406 is convexly recurved in a direction opposite that taken by segment 1402.

Similarly, an outer surface 1410 of end portion 610 has a first, outboard segment 1412 that extends from its margin 1414 with outer surface 1416 of main portion 602 to a margin 1418 with a second, inboard surface segment 1420. First segment 1412 is concavely curved relative to main portion center 630 and in an xy plane. Second, inboard surface segment 1420 extends from its margin 1418 with first surface segment 1410 to a margin 1422 with the outboard flange surface 1309. Inboard surface segment 1420 is convexly recurved in a direction of curvature opposite that taken by outboard surface segment 1412 and in an xy plane. A radius of curvature of inboard surface segment 1420 may be in the range of about 2 mm to about 25 mm, and in one embodiment is about 19 mm. The curved and recurved smooth transition of the end portion 610 to flange 616, and the corresponding curved and recurved smooth transitions of end portions 410 and 608 to their respective flanges, makes the deflectors more capable of withstanding bending stress between their end portions and their flanges. It also improves the aesthetics of the deflectors.

In one embodiment, the radius of curvature of the inboard surface segment 1420 of end portion 610 is significantly greater than the radius of curvature of the main portion outboard upper surface segment 1306 (FIG. 13). As one transitions from main portion surface segment 1306 to end portion surface segment 1420, the radius of curvature will smoothly increase. A similar smooth variance in radii of curvature will also occur at the transitions between main portion 602 and end portion 608 of the rear deflector 114, and between main portion 404 and end portion 410 of front deflector 112.

Figure 15A:
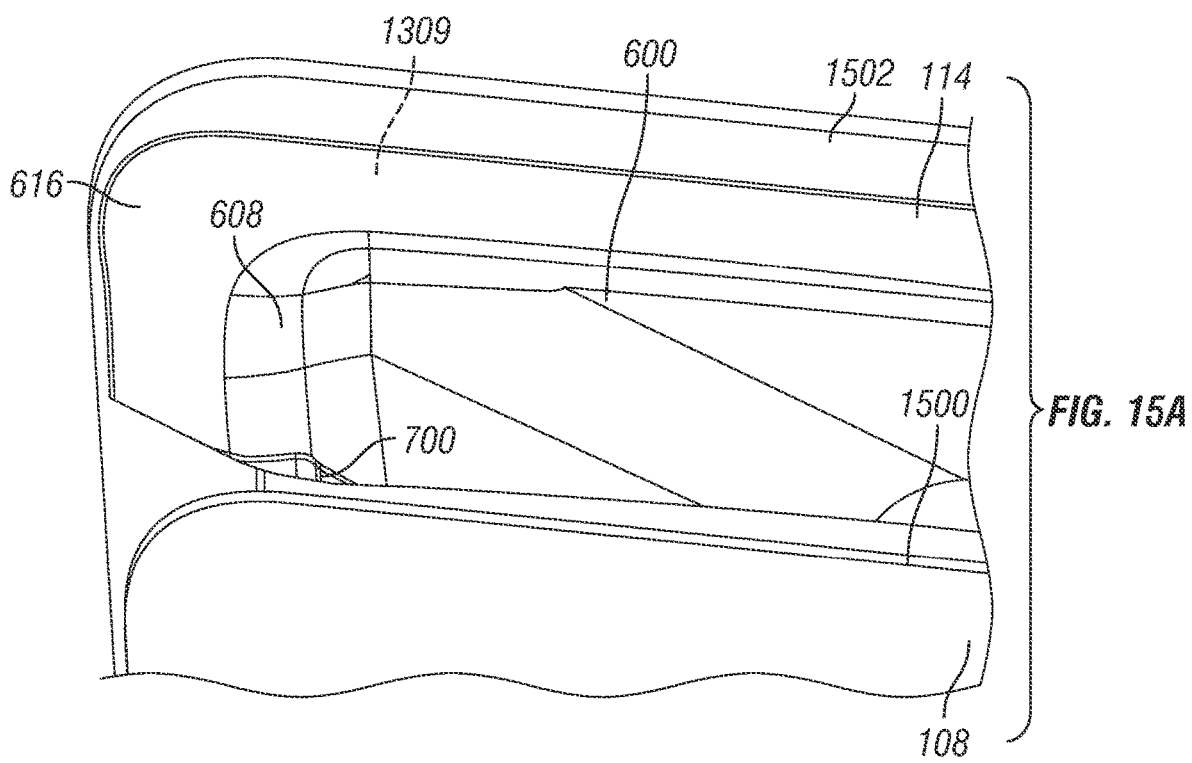
FIG. 15A is a schematic perspective detail, taken from an inboard direction, of an outer window frame panel, a deflector and a top rear portion of a window glass for a left rear door.
Figure 15B:
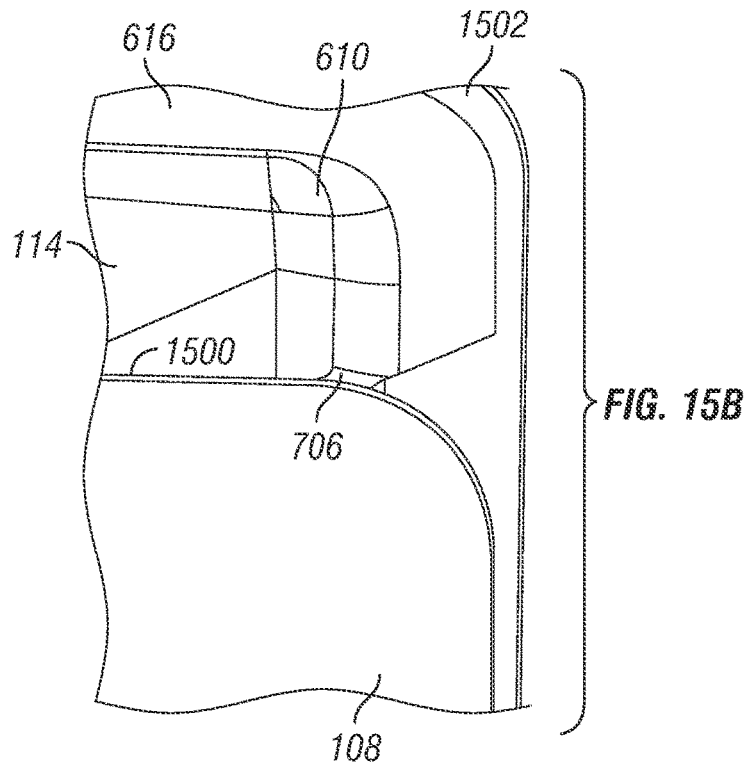
FIG. 15B is a schematic perspective detail, taken from an inboard direction, of the outer frame panel, deflector and top front portion of the window glass schematically depicted in FIG. 14A.
Figure 16:
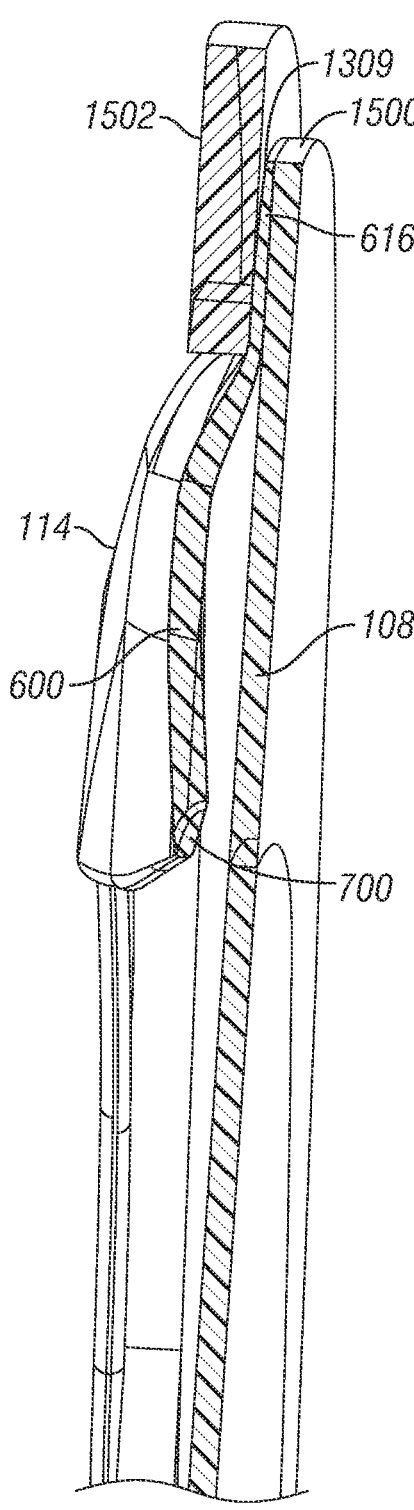
FIG. 16 is a schematic cross-sectional view of an outer door frame panel, deflector and window glass, showing the window glass in a fully raised position.

FIGS. 15A and 15B are details showing the interaction of an advancing top edge 1500 of the rear glass pane 108 with the rear end portion camming facet 700 and the front end portion camming facet 706 of rear window deflector 114. In these views, the deflector has been installed in a channel in the door frame, an outer panel of which is schematically shown at 1502. The outboard surface 1309 of flange 616 may be attached to the window channel 1502 with adhesive or the like. As glass edge 1500 advances upward, the first structures of deflector 114 which it will encounter will be camming facets 700 and 706. Once edge 1500 contacts facets 700 and 706, edge 1500 will cam or slide along their surfaces, easing the upward progression of window pane 108 until window pane 108 is in the fully raised position seen in FIG. 16. The advancing top edge of front window glass 106 will have a similar interaction with front deflector camming facet 424.

In summary, side window deflectors have been shown and described which have curved and recurved transitions between the outer surfaces of their flanges and their bodies. Each deflector body further has at least one camming facet on its inboard surface that eases the upward progress of the edge of the window glass so that the window glass may be easily seated in its respective frame channel.

While illustrated embodiments of the present invention have been described and illustrated in the appended drawings, the present invention is not limited thereto but only by the scope and spirit of the appended claims.

We claim:

1. A side window deflector for fitting into a channel of a side window of a vehicle, the side window deflector comprising:

a body that is elongate in an x direction, where x is horizontal and is substantially aligned with a fore and aft axis of the vehicle, a z direction being at right angles to the x direction and being closer to the vertical than it is to the horizontal, the body having a first end portion with a lower edge and an inner surface;

a flange for fitting into the channel of the side window of the vehicle, the flange having an inboard surface which substantially conforms to an xz sheet, the xz sheet being in alignment with the x and z directions, the flange being joined to the body, the flange having a lower edge that is joined to the lower edge of the first end portion at a junction; and a camming facet formed on the inner surface of the first end portion adjacent the junction, the inner surface of the first end portion having a surrounding portion which bounds the camming facet, the camming facet being disposed at an angle to the surrounding portion of the inner surface of the first end portion of the body.

2. The side window of claim 1, wherein the z direction is slightly inwardly curved relative to the center of the vehicle, the xz sheet being slightly concavely curved relative to center of the vehicle.

3. The side window deflector of claim 1, wherein the lower edge of the first end portion is aligned with the x direction, the lower edge of the flange extending upwardly and away from the junction at an angle to the x direction, thereby forming a corner with the lower edge of the first end portion.

4. The side window deflector of claim 1, wherein the flange and the body are integrally molded of polycarbonate.

5. The side window deflector of claim 1, wherein the first end portion of the body is a rearward end portion of the body, the lower edge of the flange being a first lower edge, the camming facet being a first camming facet, the side window deflector further comprising:

a forward end portion of the body opposed to the rearward end portion, the forward end portion having a lower edge and an inner surface, the flange having a second lower edge spaced from the first lower edge and joining the lower edge of the forward end portion at a second junction, a second camming facet formed adjacent the second junction on the inner surface of the forward end portion, the inner surface of the forward end portion including a second surrounding portion which bounds the second camming facet, the second camming facet being disposed at an angle to the second surrounding portion of the inner surface of the forward end portion of the body.

6. The side window deflector of claim 1, wherein a y direction is horizontal and is at right angles to the fore and aft axis of the vehicle, the inboard surface of the first end portion of the body being curved in an xy plane aligned to the x and y directions.

7. A side window deflector for fitting into a channel of a side window of a vehicle, the side window deflector comprising:

a body that is elongate in an x direction, where x is horizontal and is substantially aligned with a fore and aft axis of the vehicle, a z direction being at right angles to the x direction and being closer to the vertical than it is to the horizontal, the body having a first end portion with a lower edge and an inner surface;

a flange for fitting into the channel of the side window of the vehicle, the flange having an inboard surface which substantially conforms to an xz sheet, the xz sheet being in alignment with the x and z directions, the flange being joined to the body, a lower edge of the flange joined to the lower edge of the first end portion of the body at a junction; and a camming facet formed on the inner surface of the first end portion of the body to be adjacent the junction, the flange having a first thickness, a region of the first end portion of the body bounding the camming facet having a second thickness greater than the first thickness, a thickness of the camming facet varying from the first thickness to the second thickness, the thickness of the camming facet increasing as a function of a distance from the lower edge of the first end portion, the thickness of the camming facet also increasing as a function of a distance from the flange.

8. The side window deflector of claim 7, wherein the z direction and the xz sheet are concavely curved relative to a center of the vehicle.

9. The side window deflector of claim 7, wherein a y direction is at right angles to a fore and aft axis of the vehicle and is horizontal, the inner surface of the first end portion of the body being curved in an xy plane, the xy plane being aligned to the x and y directions.

10. The side window deflector of claim 7, wherein an inner surface of the camming facet is roughly triangular in shape and has an apex that is at a furthest distance in the z direction from the lower edge of the first end portion.

11. The side window deflector of claim 7, wherein the lower edge of the first end portion is aligned to the x direction, the lower edge of the flange extending upwardly at an angle to the x direction away from the junction, thereby forming a corner at the junction.

12. The side window deflector of claim 7, wherein the first end portion of the body is a rearward end portion of the body, the lower edge of the flange being a first lower edge, the camming facet being a first camming facet, the side window deflector further comprising:

a forward end portion of the body opposed to the rearward end portion, the forward end portion having an lower edge and an inner surface, the flange having a second lower edge spaced from the first lower edge and joining the lower edge of the forward end portion at a second junction, a second camming facet formed on the inner surface of the forward end portion to be adjacent the second junction, a second region of the forward end portion bounding the second camming facet having a third thickness that is greater than the first thickness, a thickness of the second camming facet varying from the first thickness to the third thickness, the thickness of the second camming facet increasing as a function of a distance away from the lower edge of the forward end portion, the thickness of the second camming facet also increasing as a function of a distance away from the flange.

13. The side window of claim 12, wherein the third thickness is substantially equal to the second thickness.

14. A side window deflector for fitting into a side window of a vehicle, the side window deflector comprising:

a body that is elongate in an x direction, where x is horizontal and is substantially aligned with a fore and aft axis of the vehicle, a z direction being at right angles to the x direction and being closer to the vertical than it is to the horizontal, the body having a first end portion with an inner surface and a lower edge;

a flange for fitting into the channel of the side window of the vehicle, the flange having an inboard surface which substantially conforms to an xz sheet, where the xz sheet is in alignment with the x and z directions, the flange being joined to the body, a lower edge of the flange being joined to the lower edge of the first end portion of the body at a junction; and a camming facet formed on the inner surface of the first end portion to be adjacent the junction, the facet formed at an angle to the xz sheet such that an upper edge of a window glass will first contact the first end portion at the camming facet when upwardly advancing toward the channel of the vehicle side window.

15. The side window deflector of claim 14, wherein the z direction and the xz sheet are concavely curved relative to a center of the vehicle.

16. The side window deflector of claim 14, wherein the first end portion of the body is a rearward end portion of the body, the lower edge of the flange being a first lower edge, the camming facet being a first camming facet, the side window deflector further comprising:

a forward end portion of the body opposed to the rearward end portion, the forward end portion having an inner surface and a lower edge, the flange having a second lower edge spaced from the first lower edge and joining the lower edge of the forward end portion at a second junction, a second camming facet formed adjacent the second junction on the inner surface of the forward end portion, the second camming facet formed at a second angle to the xz sheet such that an upper edge of the window glass will first contact the side window deflector at the first and second camming facets when upwardly advancing toward the channel of the side window of the vehicle.

17. The side window deflector of claim 14, wherein the lower edge of the first end portion is aligned to the x direction, the lower edge of the flange extending away from the junction upwardly and at an angle to the x direction, thereby forming a corner at the junction.

* * * * *